US011429605B2

(12) United States Patent
Cruanes et al.

(10) Patent No.: US 11,429,605 B2
(45) Date of Patent: Aug. 30, 2022

(54) SYSTEM AND METHOD FOR DISJUNCTIVE JOINS

(71) Applicant: SNOWFLAKE INC., San Mateo, CA (US)

(72) Inventors: Thierry Cruanes, San Mateo, CA (US); Florian Andreas Funke, San Francisco, CA (US); Guangyan Hu, Piscataway, NJ (US); Jiaqi Yan, San Carlos, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/327,521

(22) Filed: May 21, 2021

(65) Prior Publication Data

US 2021/0326340 A1 Oct. 21, 2021

Related U.S. Application Data

(63) Continuation of application No. 17/105,406, filed on Nov. 25, 2020, which is a continuation of application No. 16/818,283, filed on Mar. 13, 2020, now Pat. No. 10,877,967.

(51) Int. Cl.
*G06F 16/00* (2019.01)
*G06F 16/2453* (2019.01)
*G06F 16/2455* (2019.01)

(52) U.S. Cl.
CPC .. *G06F 16/24537* (2019.01); *G06F 16/24556* (2019.01)

(58) Field of Classification Search
CPC ......... G06F 16/24556; G06F 16/24542; G06F 16/24537
See application file for complete search history.

(56) References Cited

U.S. PATENT DOCUMENTS

| 8,290,972 B1* | 10/2012 | Deshmukh ........ G06F 16/24556 707/758 |
| 10,545,917 B2* | 1/2020 | Dageville ........... G06F 16/2456 |
| 10,545,982 B1 | 1/2020 | Kramer |
| 2002/0143755 A1* | 10/2002 | Wynblatt ............ G06F 16/2471 |
| 2004/0044662 A1* | 3/2004 | Ganesan ........... G06F 16/24542 |
| 2006/0080285 A1 | 4/2006 | Chowdhuri |
| 2007/0255823 A1* | 11/2007 | Astley ..................... H04L 43/00 709/224 |
| 2008/0033914 A1* | 2/2008 | Cherniack ............. G06F 16/283 |
| 2010/0030756 A1* | 2/2010 | Ahmed ............ G06F 16/24534 707/760 |
| 2011/0082856 A1* | 4/2011 | Subbiah ............ G06F 16/24542 707/718 |

(Continued)

*Primary Examiner* — Leslie Wong
(74) *Attorney, Agent, or Firm* — Womble Bond Dickinson (US) LLP

(57) ABSTRACT

Joining data using a disjunctive operator is described. An example computer-implemented method can include receiving a query that includes a first disjunctive predicate involving a first table and a second table. The method may also include determining a first set of rows from the first table and generating a filter from the first set of rows. The method may also further include applying the filter to the second table to generate a second set of rows. Additionally, the method may also include joining the first set of rows and the second set of rows using a first disjunctive operator of the first disjunctive predicate to generate a first results set.

26 Claims, 9 Drawing Sheets

(56) References Cited

U.S. PATENT DOCUMENTS

| | | | |
|---|---|---|---|
| 2012/0084278 A1 | 4/2012 | Franke et al. | |
| 2013/0031229 A1* | 1/2013 | Shiga | G06F 16/2471 709/223 |
| 2014/0067789 A1* | 3/2014 | Ahmed | G06F 16/24544 707/714 |
| 2014/0258266 A1 | 9/2014 | Cruanes et al. | |
| 2014/0279944 A1* | 9/2014 | Ghandeharizadeh | G06F 16/2365 707/690 |
| 2015/0234888 A1* | 8/2015 | Ahmed | G06F 16/2425 707/765 |
| 2015/0339349 A1* | 11/2015 | Ahmed | G06F 16/24556 707/714 |
| 2016/0034486 A1* | 2/2016 | Dageville | G06F 16/2237 707/747 |
| 2016/0196306 A1* | 7/2016 | Beavin | G06F 16/2255 707/714 |
| 2016/0350347 A1* | 12/2016 | Das | G06F 12/023 |
| 2017/0116292 A1* | 4/2017 | Boehme | G06F 16/248 |
| 2017/0255675 A1 | 9/2017 | Chavan et al. | |
| 2018/0225316 A1* | 8/2018 | Boles | G06F 16/2246 |
| 2018/0357434 A1* | 12/2018 | Roy | H04L 9/0643 |
| 2019/0220619 A1* | 7/2019 | Loza | G06F 21/602 |
| 2019/0361621 A1* | 11/2019 | S | G06F 3/0608 |
| 2020/0026788 A1* | 1/2020 | Bellamkonda | G06F 16/278 |
| 2020/0341981 A1* | 10/2020 | Fender | G06F 16/248 |

* cited by examiner

SYSTEM AND METHOD FOR DISJUNCTIVE JOINS

CROSS REFERENCE TO RELATED APPLICATIONS

This application is a continuation of U.S. patent application Ser. No. 17/105,406, filed Nov. 25, 2020, which is a continuation of U.S. patent application Ser. No. 16/818,283, filed Mar. 13, 2020, now U.S. Pat. No. 10,877,967, issued on Dec. 29, 2020, the disclosure of which are incorporated by reference in its entirety.

TECHNICAL FIELD

The present disclosure relates to query processing and, in particular, to optimizing a query that includes a disjunctive join.

BACKGROUND

Joins are a fundamental operation in analytic database systems. Furthermore, a hash join operator can be used to compute joins, if the join predicate is a (selective) equality condition. If there is no equality condition or it is significantly less selective than the overall predicate (for example, including a disjunctive operation), then the join degenerates into a cross product with a post filter where each row from the left side is matched with each row from the right side and the predicate is used to eliminate rows from this intermediate result. A hash join implementation can process the join operation in parallel on multiple servers. It can adaptively switch between broadcasting the build side to all servers and hash-partitioning hash joins based on the size of the build-side. For hash-partitioning hash joins, joins without a conjunctive component in the predicate are restricted to using a single server, reducing the degree of parallelism to one.

In addition, bloom filters and range bloom filters can be used for conjunctive join predicates to eliminate probe-side rows without a matching build-side join partner early: Before scanning a micro-partition (or "file"), the micro-partition's minimum and maximum values of the equality join key(s) are tested against the range bloom filters. Thus, range bloom filters can potentially skip loading files from cloud storage, unpacking and processing them all together.

Furthermore, bloom filters can filter out individual rows (from those files that pass the range bloom filter) so they do not have to be sent over the network (in case of a hash-hash join) and do not have to be probed into a hash table. Both techniques have proven to be very effective in reducing the amount of data that has to be processed.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
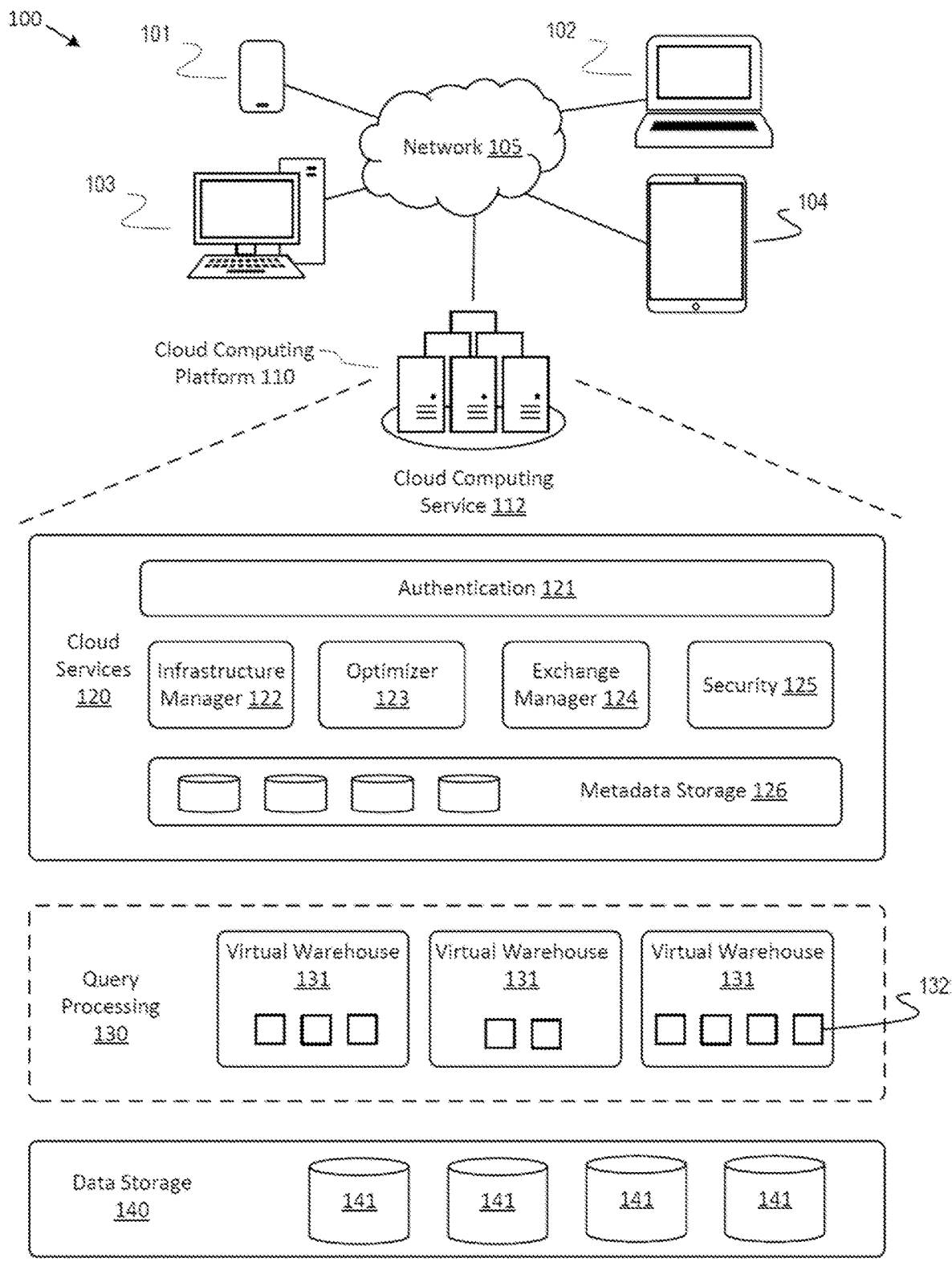
FIG. 1 is a block diagram depicting an example computing environment in which the methods disclosed herein may be implemented.

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

In data management, data within a relational database may be manipulated in order to make it useful and to derive information. Other times data from a plurality of relational databases may be compared and/or joined to make it more usable. For example, a relational join is one of the fundamental data processing operations in a relational data management system. A join is a binary operator, taking two relations R and S, and a binary predicate θ as inputs, and producing a single relation R θ S which contains the set of all combinations of tuples in R and S which satisfy the predicate θ. Furthermore, a join can include different joins not covered by the above, such as Anti- and Semi-Joins (or other types of joins that have an additional projection (e.g., that projects only the attributes of one side) and Outer Joins that may contain NULL-extended rows if a row does not find a single "join partner" (=row from the other side).

A single query can perform multiple such joins, resulting in tree-shaped execution plans (e.g., a "query plan"). Joins form intermediate nodes of that tree, and base relations from leaves of that tree. Data flows from the leaves of the tree towards the root, where the final query result is produced. The execution time of a query is directly related to the amount of intermediate data it produces. Relational data management systems thus seek to minimize the amount of intermediate data which flows through the tree in order to minimize the execution time of the query.

In one embodiment, a system computes joins that include disjunctive operators using at least one of bloom filters, range bloom filters, and hash joins is described. In this embodiment, a system can process a disjunctive join that includes a build-side input and a probe-side input using a bloom filter or range bloom filter that is generated based on at least the values associated with the build-side input. For the join operation:

$$A.i=B.j \text{ OR } A.k=B.l,$$

The "A.i=B.j" is the build-side input and the "A.k=B.l" is the probe-side input. By using either the bloom filter or the range bloom filter, the amount of rows in the probe-side input needed for analysis in the disjunctive join is reduced. This can be especially useful in a distributed storage system, where the probe-side input is stored on a different node and reducing the amount of data needed for the join reduces the amount of compute and network resources needed for use in computing the join. Furthermore, the system can deduplicate the results when multiple joins are involved.

In a further embodiment, the system can utilize hash tables for a join that includes one or more conjunctive and/or disjunctive joins. In this embodiment, the system builds separate hash tables for each disjunct as well as for the conjunctive component of the predicate. For each probe-side row that reaches the join (e.g., rows from the probe-side table(s) that are not filtered out by disjunctive range bloom filters or disjunctive bloom filters), the system probes the hash tables and combines the result. In one embodiment, combining the result would retain the logic of the predicate. For example and in one embodiment, a build-side row qualifies if it satisfies the conjunctive part of the predicate and at least one of the disjuncts.

FIG. 1 is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 110. These services tie together all of the different components of the cloud computing service 110 in order to process user requests, from login to query dispatch. Cloud services 120 may operate on compute instances provisioned by the cloud computing service 110 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security 125 engine, and metadata storage 126.

In one embodiment, the cloud computing service 112 can handle a query of data that includes a join operation for data stored or otherwise associated with the cloud computing service 112. Joins are a fundamental operation in a database system. In this embodiment, a join can have a left and a right input. The left input is called the build-side and the right input is called the probe-side. The condition that specifies whether a row from the left side matches with a row from the right side is called the join predicate or join condition. In one embodiment, complex joins can include join conditions of the following form:

left.$c_0 l$=right.$c_0 l$ AND . . . AND left.$c_0 q$=right.$c_0 q$
AND ((left.$c_1 l$=right.$c_1 l$ AND . . . AND
left.$c_1 n$=right.$c_1 n$) OR . . . OR
(left.$c_m l$=right.$c_m l$ AND . . . AND
left.$c_m k$=right.$c_m k$))

In this embodiment, the underlined that are ORed together are "disjuncts" (or "disjunctive") and the italicized components that are ANDed together the "conjunctive" part of the predicate, where "left" and "right" represent one or two tables of a relational database and the ".$c_x y$" represents a particular column of that table.

Figure 2:
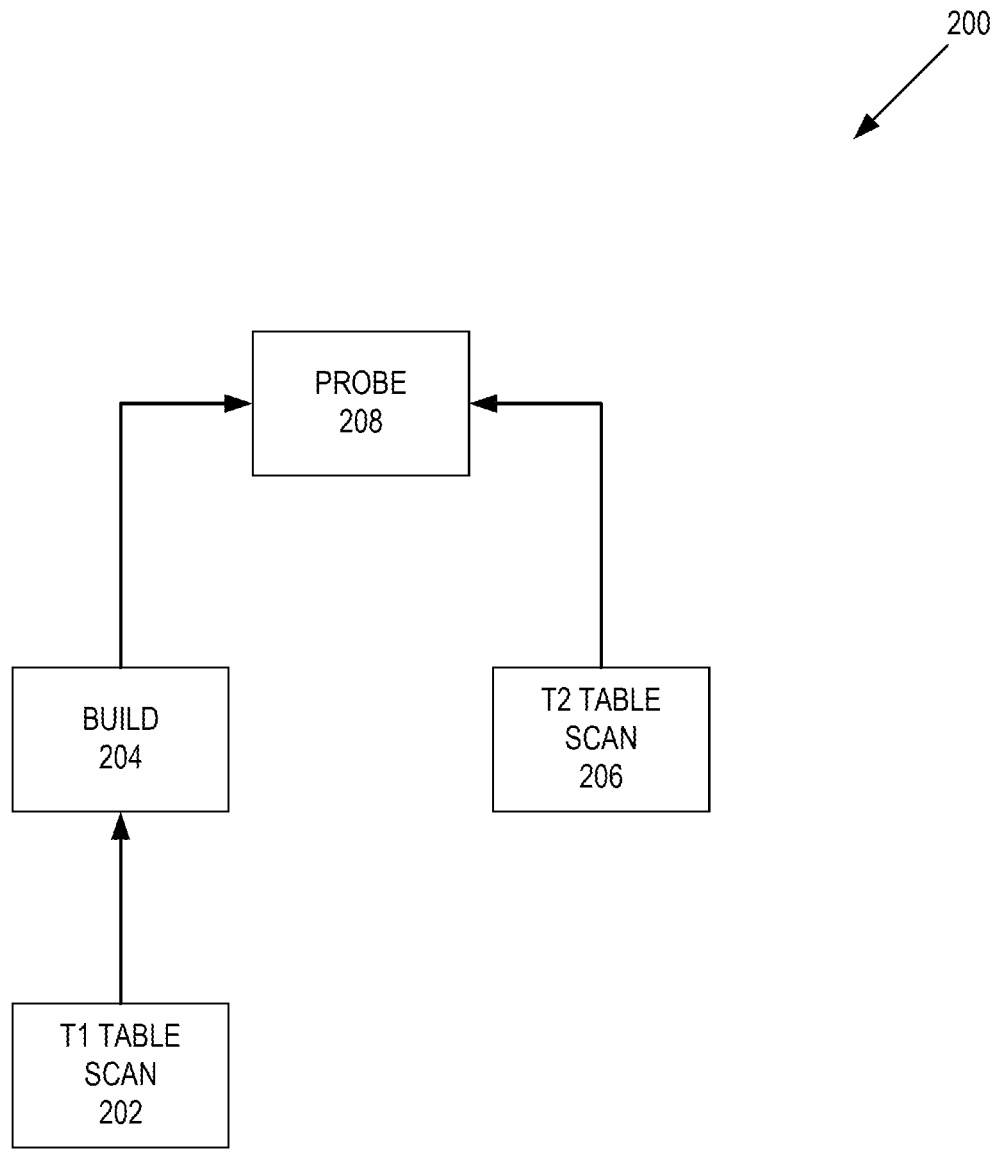
FIG. 2 is a schematic block diagram of one embodiment of join operation involving two tables.

FIG. 2 is a schematic block diagram of one embodiment of join operation 200 involving two tables. In FIG. 2, two tables are joined together to generate a set of results. In one embodiment, the join implementation is split into two operators: Build 204 and Probe 208. In this embodiment, a table scan 202 of the left side table (e.g., table, T1) generates a set of rows that are used by the build operator 204. In one embodiment, a table scan is a scan of a table based on some condition (e.g., a column data equals a value, etc.). The build operator 204 dynamically chooses the join distribution method, typically either a partition-wise join or a broadcast join. In addition, a table scan of the right-side table 206 (e.g., T2) generates a second set of rows used for the probe operator 208. The probe operator 208 computes the actual, local joins using one of the well-known techniques such as hash join, merge join, nested loops join.

In one embodiment, a hash join operator can be used to compute joins. In this embodiment, the hash joins can efficiently compute the result of a join if the join predicate is a (selective) equality condition. If there is no equality condition or it is significantly less selective than the overall predicate, then the join degenerates into a cross product with a post filter, e.g., each row from the left side is matched with each row from the right side and the predicate is used to eliminate rows from this intermediate result.

In one embodiment, a hash join implementation can process the join operation in parallel on multiple servers. Furthermore, the hash join implementation can adaptively switch between broadcasting the build side to all servers and hash-partitioning hash joins based on the size of the build-side. For hash-partitioning hash joins, however, joins without a conjunctive component (e.g., a join that includes a disjunctive component), in the predicate are restricted to using a single server, reducing the degree of parallelism to one.

In one embodiment, bloom filters and range bloom filters can be used to eliminate probe-side rows without a matching build-side join partner early. Before scanning a micro-partition (or "file"), the micro-partition's minimum and maximum values of the equality join key(s) are tested against the range bloom filters. Thus, range bloom filters can potentially skip loading files from cloud storage, unpacking and processing them all together. Bloom filters can filter out individual rows (from those files that pass the range bloom filter) so they do not have to be sent over the network (in case of a hash-partitioning hash-join) and do not have to be probed into a hash table. Both techniques have proven to be very effective in reducing the amount of data that has to be processed. In one embodiment, applying bloom filter and/or range bloom filter is further illustrated in U.S. Pat. No. 10,545,917, entitled "MULTI-RANGE AND RUNTIME PRUNING," filed on Oct. 13, 2015.

Figure 3:
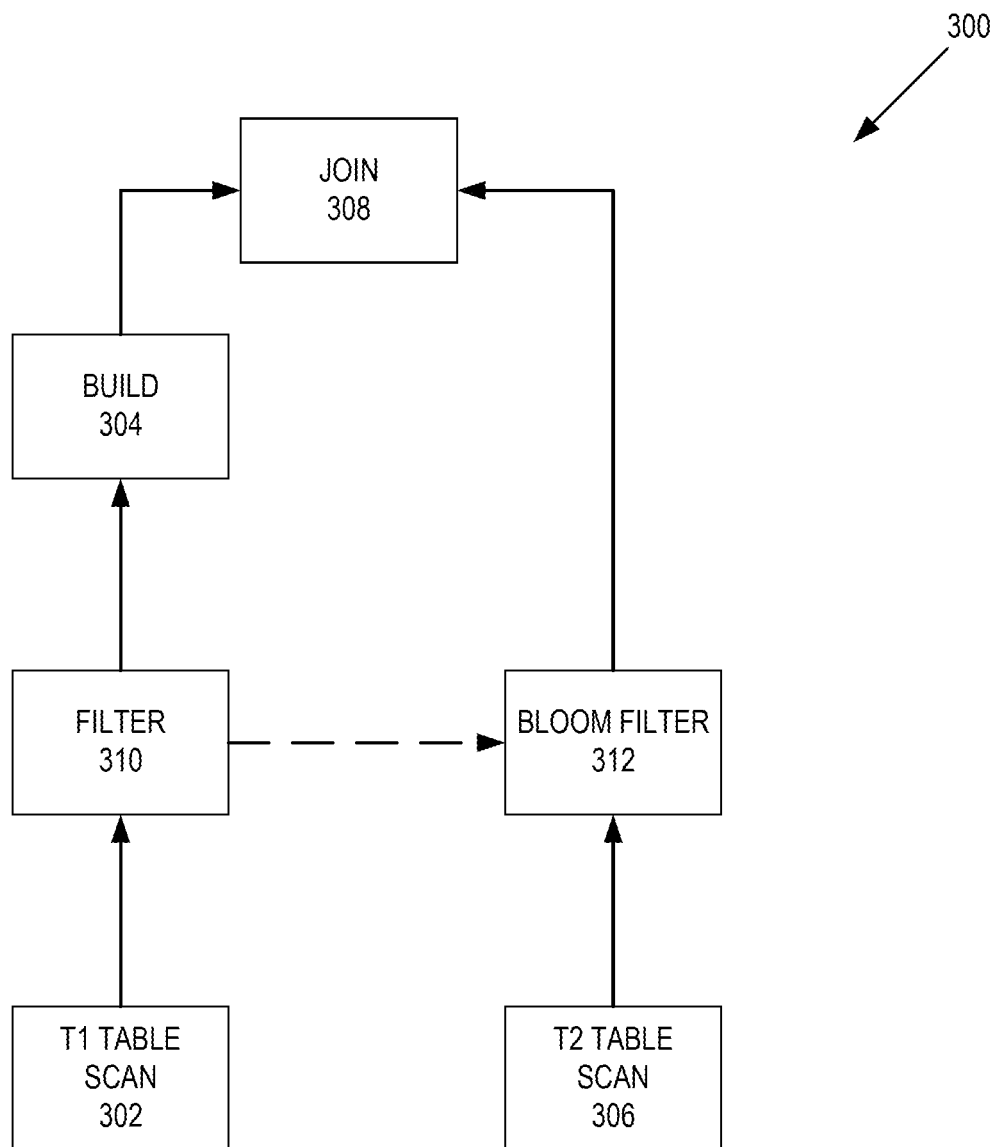
FIG. 3 is a schematic block diagram of one embodiment of join operation involving two tables and a bloom filter.

In one embodiment, these techniques can be adapted for use for joins with OR conditions. FIG. 3 is a schematic block diagram of one embodiment of join operation 300 involving two tables and a bloom filter. In one embodiment, as in FIG. 2, table scans 302 and 304 generate a first and second set of rows that are used for the join operation. In one embodiment, the first set of rows from the T1 table scan 302 are based on some condition and are filtered 304. In one embodiment, each row from table T1 would be tested against a filter and (if it passes) be materialized by the join. In one embodiment, the filter 210 could be any type of filter that is either explicitly or implicitly specified by the query's semantics (e.g., a semantic from a SQL query). For example and in one embodiment, a query could be:

SELECT*FROM TABLE_L JOIN TABLE_R ON
(L_ID=R_ID) WHERE L_CITY LIKE 'SAN %'

This query joins two tables (TABLE_L and TABLE_R) but only those rows from TABLE_L are being considered where attribute L_CITY starts with "SAN". This is an explicit filter that might produce a query plan like 300 (where TABLE_L would be T1). The join adds information about each row the join receives to its bloom filters and range bloom filters (RBFs). Bloom filters and range bloom filters are then sent to the right side of the plan (e.g., Bloom Filter 312). In one embodiment, the RBFs are applied to the second set of rows generated by the T2 table scan 306. In one embodiment, the application of the RBFs to the second set of rows can potentially eliminate entire micro-partitions from the table T2. For example and in one embodiment, if table T2 is stored in as a set of files and there is metadata characterizing the tables (e.g., minimum and maximum ranges for data stored in each file), an RBF can be applied using the file metadata and eliminate one or more files of table. In one embodiment, this analysis can be applied at the node that stores the table, such that the files can be eliminated from the join without having to send those files to another node that is performing the join. Not only does this save processing resources, applying the RBF can save networking and storage resources.

In a further embodiment, the Bloom Filter 312 operator may further reduce the number of rows by applying the RBF again, but on a row-by-row basis and by applying the bloom filters. In this embodiment, the rows that pass these checks are sent (potentially over the network) to the join 308. In one embodiment, by generating the bloom filter and range bloom filters using the reduces the number of rows that need to be processed by the join operation 308. For example and in one embodiment, a query optimizer (e.g., Optimizer 123 as described in FIG. 1 above) detects an applicable join condition and annotates query plan. The join operation builds a separate range bloom filter for each detected disjunct. The bloom filter operation 312 applies each of range bloom filters until (a) this operation finds an overlap with a current micro-partition's minimum and maximum values or (b) no more such range bloom filters exist. If no overlap was found, then this micro-partition can be skipped, (e.g., that micro-partition does not need to be loaded, decompressed and processed).

In a further example a similar technique is used with a row bloom filter operator, as applied on a per-row level instead of per micro-partition. In this example, a query optimizer (e.g., Optimizer 123 as described in FIG. 1 above) detects an applicable join condition and annotates query plan. The join operation builds a separate bloom filter for each detected disjunct. The bloom filter operation 312 applies each of bloom filters until (a) this operation finds a match or (b) no more such bloom filters exist. If no match was found, then this row can be discarded.

Figure 4:
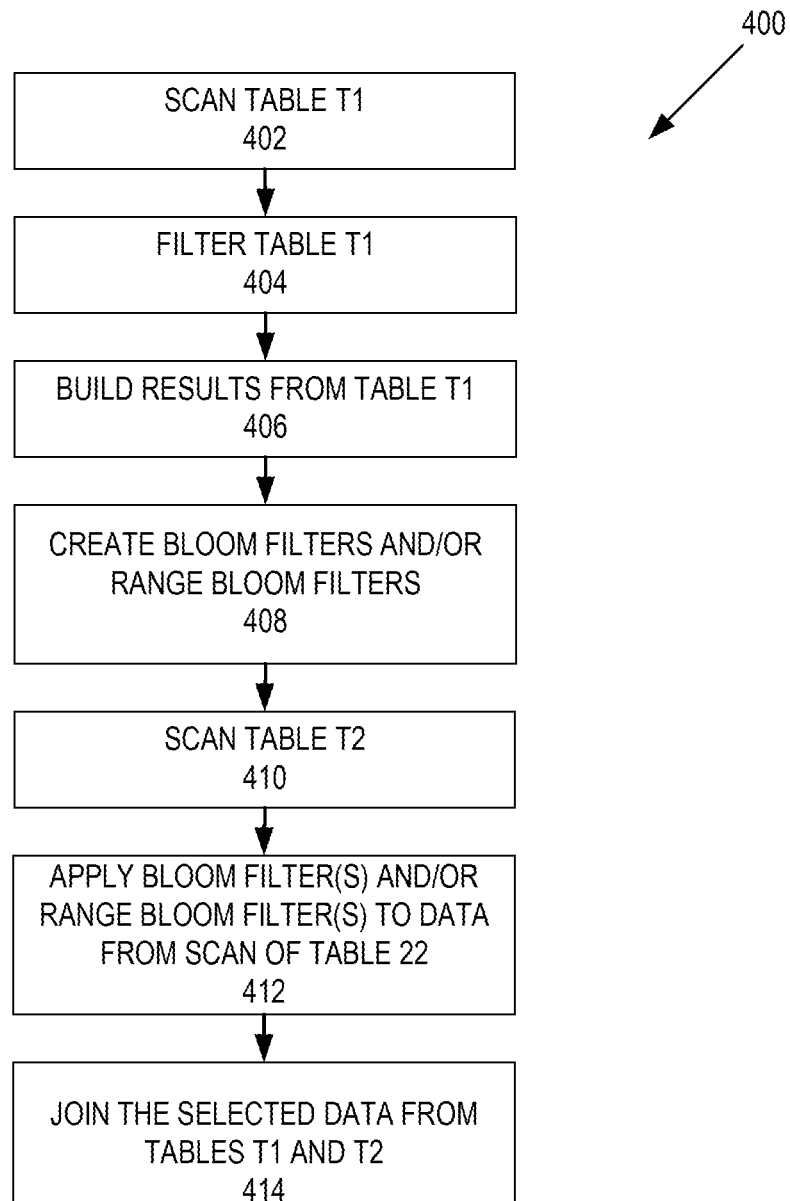
FIG. 4 is a process flow diagram of one embodiment of a method to perform a join operation between two tables using a bloom filter.

FIG. 4 is a process flow diagram of one embodiment of a method 400 to perform a join operation between two tables using a bloom filter. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 400 may begin at step 402, where the processing logic scans the left side table, e.g., table T1. In one embodiment, the table scan can be based on a condition (e.g., T1.col1=value). At step 404, method 400 filters the left-side table, table T1. In one embodiment, each row from table T1 would be tested against a filter and (if it passes) be materialized by the join.

Method 400 builds the results from table T1 at step 406. At step 408, method 400 creates a bloom filter and/or a range bloom filter based on the results of the table scan and filtering of Table T1. In one embodiment, method 400 creates a range bloom filter for each disjunct. Alternatively, or in combination, method 400 builds a bloom filter for each disjunct. In one embodiment, a "bloom filter" is a space-efficient probabilistic data structure that is used to test whether an element is a member of a set. False positive matches are possible, but false negatives are not. Thus, a bloom filter has a 100% recall rate. In other words, a query returns either "possibly in set" or "definitely not in set" result.

An empty bloom filter is a bit array of m bits, all set to 0. There must also be k different hash functions defined, each of which maps or hashes some set element to one of the m array positions with a uniform random distribution. To add an element, the element is fed to each of the k hash functions to get k array positions, where the bits at all these positions are set to 1. To query for an element (test whether it is in the set), it may be fed to each of the k hash functions to get k array positions. If any of the bits at these positions is 0, the element is definitely not in the set. Conversely, if it were in the set, then all the bits would have been set to 1 when it was inserted. If all are 1, then either the element is in the set, or the bits have by chance been set to 1 during the insertion of other elements, resulting in a false positive.

In another embodiment, a range bloom filter uses a range bloom vector for filtering. In this embodiment, the range bloom vector includes entries that hold a minimum and maximum value pair which describes a range of values present in the input data set of the input relation (e.g., the left side table). For example and in one embodiment, the range bloom vector is a bounded-size hash map (the default may be 64 entries), where each entry holds a minimum-maximum value pair which describes a range of values present in the input data set. The ranges of individual hash map entries are disjunct. A specific value in each range is chosen as the key of the hash map entry for purposes of hashing.

For any given input value, there is a simple function which maps the input value to exactly one hash key. If there is a range in the range bloom vector which contains the input value, then the range bloom vector's hash map will contain an entry for the respective key, and the range of that entry will encompass the input value.

At step 410, processing logic scans the right side table, e.g., table T2. In one embodiment, the table scan can be based on a condition (e.g., T2.col2=value). Processing logic applies the bloom filter and/or the range bloom filter to the data from the table scan of table T2 at step 412. In one embodiment, processing logic applies the bloom filter(s) and/or range bloom filter(s) as described in FIG. 3 above. In this embodiment, applying the bloom filter(s) and/or range bloom filter(s) reduces the amount of data being processed by the join, thus improving the functionality of the device by having less data to process and/or communicate across a network. At step 414, processing logic joins the selected data from tables T1 and T2.

In one embodiment, the query processor (e.g., query processor 130) can generate separate hash tables for each of the disjuncts and conjuncts that are part of the query. These separate hash tables can be used to optimize the query. In this embodiment, the query processor 130 detects an applicable join condition and annotates query plan. For example and in one embodiment, during query optimization, the optimizer identifies supported disjunctive join conditions from the logical representation of the join operation, construct disjunctive join keys, and cache these disjunctive join keys in the logical join representation. This representation can be used in three scenarios: (1) When the optimizer generates physical join operators (Join Build, Join Probe) based on the logical join, the optimizer propagates the disjunctive key information from the logical join; (2) similarly, when the optimizer generates bloom filters, the optimizer associates the bloom filter with a logical join, and the optimizer propagates the disjunctive key information to generate disjunctive bloom filters (where the bloom filters can later be moved around the query plan and this information can still be retained); and (3) when the optimizer generates runtime information for table scans, the optimizer looks up joins related to the table scan, and set up range bloom vectors for the table scan. Eventually, this information of disjunctive join keys (what the keys are, which join build they come from, etc.) are annotated with the plan information and sent to the query processor, which performs corresponding optimizations based on the annotated information.

Furthermore, the join builds separate hash tables for each disjunct as well as for the conjunctive component of the predicate. These hash tables are used by probing the hash for each probe-side row that reaches the join (e.g., rows that are not filtered out by disjunctive range bloom filters or disjunctive bloom filters) and combines the result. In one embodiment, the combining of the result will retain the logic of the predicate: A build-side row qualifies if it satisfies the conjunctive part of the predicate and at least one of the disjuncts.

In addition, these hash tables can share a copy of the build-side data D (or a partition thereof in case of a hash-partitioning hash join). In one embodiment, each hash table entry in the hash table points to a row of the build side partition. A single key can have multiple entries. For example and in one embodiment, a build-side table has two columns, LASTNAME and FIRSTNAME and the following three rows:

Miller, John
Smith, Jane
Miller, Eve

If the join condition is LASTNAME, a hash table would be built that has two keys ("Miller" and "Smith"). Key "Smith" has one entry pointing to the second row. Key "Miller" has two entries, one pointing to the first row and one pointing to the last/third row. Specifically, each hash table maps the values of the conjunct's columns or a disjunct's columns to a set of pointers that each reference a row stored in D. In one embodiment, these rows can be stored in different memory buffers. Buffers can be in any order, e. g., the start address of buffer N is not guaranteed to be before or after the start address of buffer N+1. In a further embodiment, the sets of pointers are stored in array lists. While in one embodiment, a hash table is used, in alternative embodiments, a different type of lookup table can be used, as would be appreciated by one of skill in the art.

Figure 5:
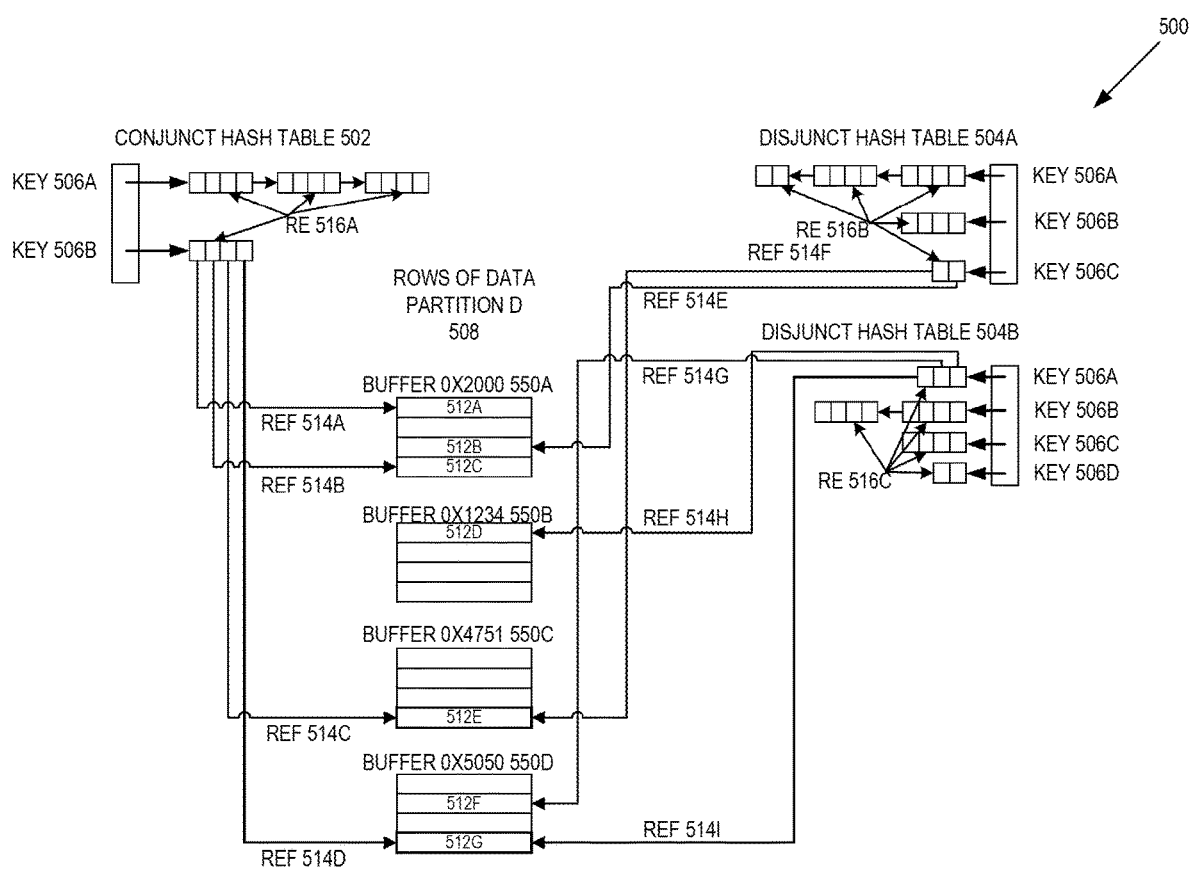
FIG. 5 is a schematic block diagram of one embodiment of a hash join for disjunctive joins.

FIG. 5 is a schematic block diagram of one embodiment of a hash join 500 for disjunctive joins. In one embodiment, FIG. 5 illustrates an example of a data layout of these hash tables and structures. In this example, the join has predicate of the form $$\text{left}.A=\text{right}.B \text{ AND } (\text{left}.W=\text{right}.X \text{ OR } \text{left}.Y=\text{right}.Z) \qquad (1)$$

where "left" is the left-side table and "right" is the right-side table for the join and the join has a conjunct A=B and two disjuncts (W=X as well as Y=Z). In FIG. 5, the hash join includes a conjunct hash table 502 and disjunct hash tables 504A-B. While in one embodiment, there is one conjunct hash table 504 and two disjunct hash tables, in alternate embodiment, there can be independently be more or less conjunct and/or disjunct hash tables.

In one embodiment, the three hash tables (502 and 504A-B) are created, each with one entry per row. The hash table on A has two different keys (key 506A references to 12 rows with three row entries 516A, key 506B references 4 rows with one row entry 516A). Hash table W (504A) has three different keys (key 506A references 10 rows, key 506B references four rows, and key 506C references two rows). Hash table Y (504B) has 4 different keys (key 506A references to three rows, key 506B references eight rows, key 506C references four rows, and key 506D references 2 rows). For example and in one embodiment, data for these rows are stored in a data buffer. As an example, the row entries for key 506B of the conjunct hash table 502 reference 514A-D buffer entries 512A, 512C, 512E, and 512G. In addition, disjunct hash tables 504A-B have similar structures. For example and in one embodiment, key 506C of disjunct hash table 504A references 514E-F buffer entries 512B and 512E, respectively. In addition, key 506A of disjunct hash table 506B references 514G-I buffer entries 512D, 512F, and 512G, respectively. In FIG. 5, it will be appreciated that not all of the references are illustrated for clarity purposes.

In one embodiment, where a probe-side row has conjunct key "key 506B", disjunct 504A key "key 506C" and disjunct 504B key "key 506A", there are 2 matching rows (rows 512E and 512G). This is because, in this embodiment, there are only two rows that are pointed to by key 506B of the conjunct hash table 502 and either key 506C of disjunct 504A's hash table or key 506A of disjunct 504B's hash table.

Finding, however, these two matching rows efficiently can require an efficient way to iterate and compare the matching rows from each hash table. In one embodiment, a priority queue data structure for the disjunctive results can be used. The top of the priority queue is compared to the current pointer of the conjunct hash table via an auxiliary lookup data structure and decide to either emit a matching row, advance the conjunct pointer, or advance to the next disjunct pointer (of any disjunct hash table).

In one embodiment, the efficiency results from constructing the hash tables such that if multiple rows are in the same array list, these rows appear in the same order in the array list as they appear in the data partition. Note that this does not mean that the rows reside in the same order in the virtual address space, e.g. the pointers are not directly comparable for order. In a further embodiment, the auxiliary lookup data structure that maps pointers to the number of the buffer they are contained in (e.g., in FIG. 5, there are four buffers). A cache for lookup requests to the auxiliary data structure. Adaptively advancing the conjunct pointer in steps of increasing size if this is beneficial (e.g., no disjunct is surpassed).

Figure 6:
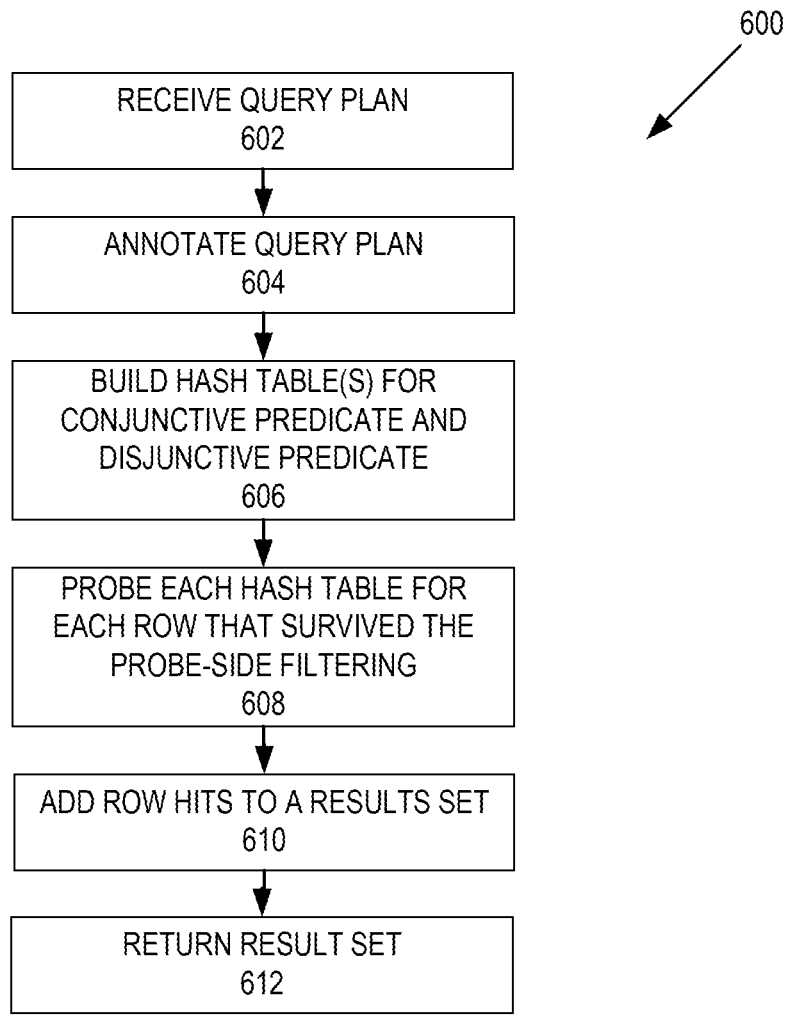
FIG. 6 is a process flow diagram of one embodiment of a method to perform a hash join for disjunctive joins.

FIG. 6 is a process flow diagram of one embodiment of a method 600 to perform a hash join for disjunctive joins. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 600 may begin at step 602, where the processing logic receives the query plan. In one embodiment, a query plan is on how to handle and/or execute the query. This can include re-writing and/or optimizing the query so that the resources used for the query can be optimized. At step 604, processing logic annotates the query plan. In one embodiment, processing logic annotates the query plan as described in FIG. 5 above. Processing logic builds one or more hash tables for the conjunctive and disjunctive predicates at step 606. In one embodiment, processing logic builds a different hash table for each of the different conjunctive and disjunctive predicates as described in FIG. 5 above. At step 608, processing logic probes each hash table for each row that survived the probe-side filtering. In one embodiment, the probe-side table(s) are filtered using one or more bloom filters and/or range bloom filters as described in FIG. 3 above. Processing logic adds row hits in the hash table(s) to a results set at step 610. In one embodiment, processing logic combines the row hits into a result set that retains the logic of the predicate. For example and in one embodiment, a build-side row qualifies if it satisfies the conjunctive part of the predicate and at least one of the disjuncts. At step 612, processing logic returns the result set.

Figure 7:
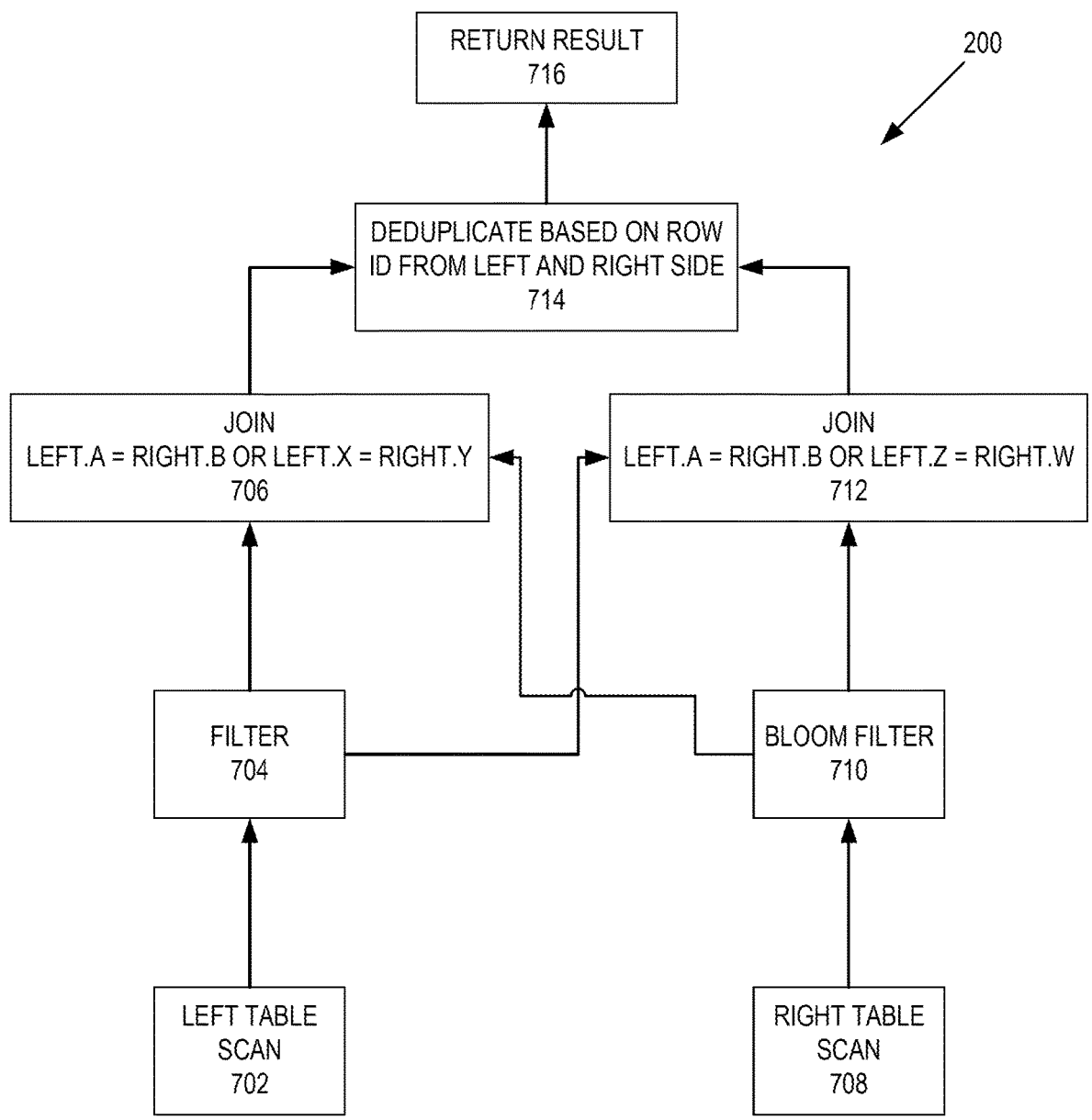
FIG. 7 is a schematic block diagram of one embodiment of optimizing a data flow for disjunctive joins.

In one embodiment, a query processor (e.g., query processor 130) can optimize a data flow with OR conditions. For example and in one embodiment, if a query includes a combination of ANDS and ORs, an optimizer can optimize the data flow for this query. FIG. 7 is a schematic block diagram of one embodiment of optimizing a data flow 700 for disjunctive joins. In one embodiment, the query processor 130 detects an applicable join condition and annotates query plan. The query processor 130 further generates a query plan that contains one join operator for each disjunct and combines the result to eliminate duplicates. Duplicate elimination is based on row identifiers that are being generated before the join. For example and in one embodiment, consider the following join:

$$\text{left}.A=\text{right}.B \text{ AND } (\text{left}.X=\text{right}.Y \text{ OR} \\ \text{left}.Z=\text{right}.W) \quad (1)$$

This query can be re-written as:

$$(\text{left}.A=\text{right}.B \text{ AND left}.X=\text{right}.Y) \text{ OR} \\ (\text{left}.A=\text{right}.B \text{ AND left}.Z=\text{right}.W) \quad (2)$$

where this query can be operated on as illustrated in FIG. 7. In one embodiment, the shape of the join predicate that our optimizations apply are in this form:

$$[C0]\hat{\ }D, \text{ where } C0 \text{ is the optional top level conjunct} \\ \text{and } D \text{ is the top level disjunct}$$

In other words, C0 is (p0_1 AND p0_2 AND . . . AND p0_n), where p0_i is left.K0_i=right.K0_i and D is of the form C1 OR C2 OR . . . OR Cn, where Ci is similar to C0, e.g. Ci=(pi_1 AND pi_2 AND . . . AND pi_n). In a further embodiment, the query processor may or may not make use of the rewrite listed above. If not, the query processor can use the "D" part of the predicate and generate disjunctive join keys over this form.

In FIG. 7, the left side table ("left") is scanned (702). The resulting rows from the left-side table scanned is filtered (704). The filtered results are forwarded to both of the joins 706 and 712.

For the right-side table, the right-side table is scanned (708) and is filtered using the bloom filter and/or range bloom filter as described in FIG. 3 above. The results of this filtering is forwarded to both joins 706 and 712. With the filtered sets of rows from each table, the joins (706 and 712) can be performed for each set of predicates. In one embodiment, because these joins can return duplicate data, the data can be deduplicated (714) based on a row identifier generated before the join. By using the row identifiers, the duplicate rows can be discarded. The deduplicated data can be returned as a result (714).

Figure 8:
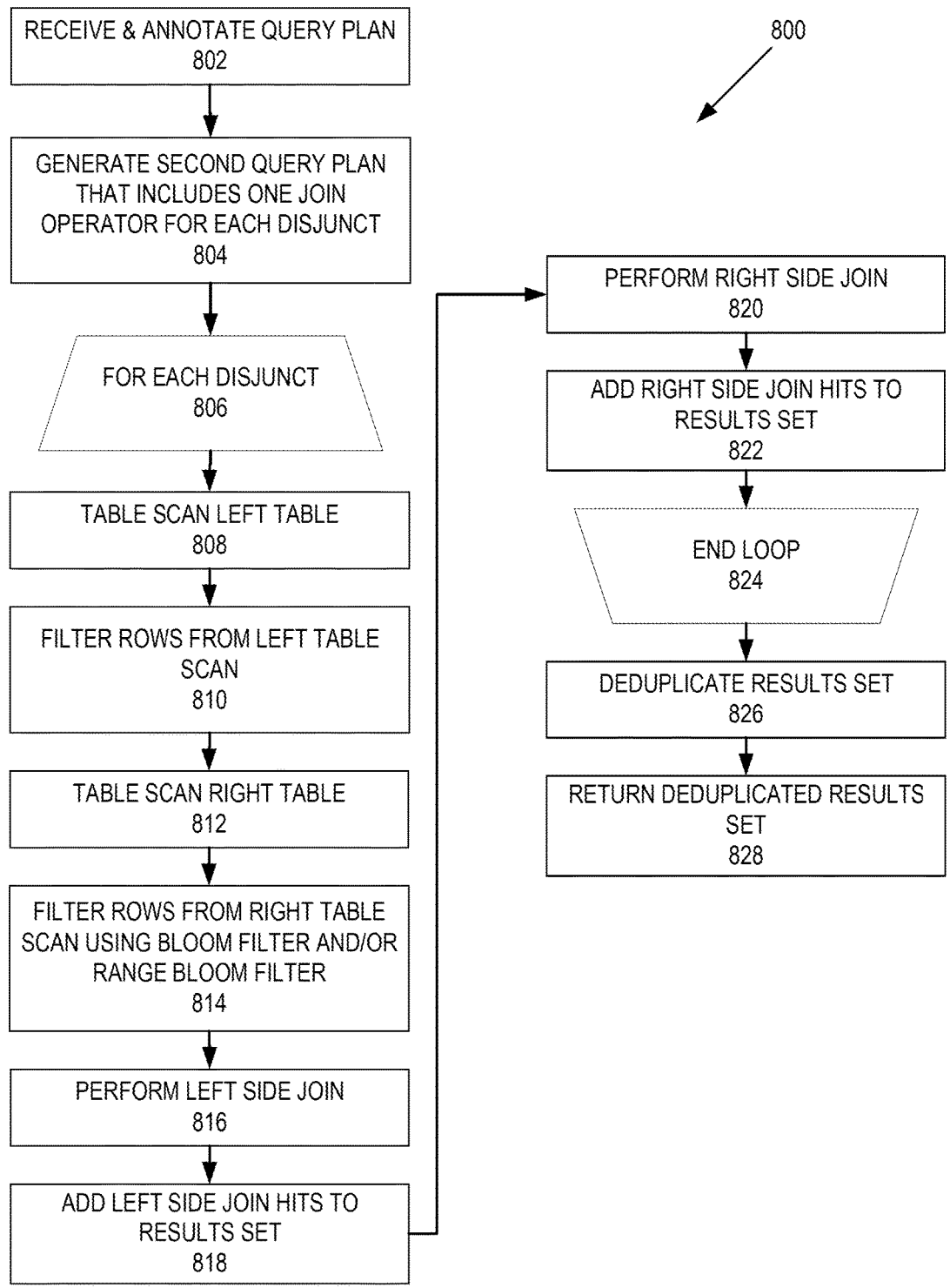
FIG. 8 is a process flow diagram of one embodiment of a method to optimize a data flow for disjunctive joins.

FIG. 8 is a process flow diagram of one embodiment of a method 800 to optimize a data flow for disjunctive joins. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the query processing 130. Method 800 may begin at step 802, where the processing logic receives and annotates the query plan at step 802. In one embodiment, the query plan is annotated as described in FIG. 6 above. At step 804, processing logic generates a second query plan that includes one join operator for each disjunct. In one embodiment, the processing logic transforms the received query into a new query that has a join operator for each disjunct as described in FIG. 7.

Processing logic performs a processing loop (blocks 806-824) to generate a results set for each of the disjuncts. At block 808, the processing logic performs a table scan of the left side table. In one embodiment, the processing logic performs a left-side table scan as described in FIG. 7 above. The processing logic filters the row from the left table scan at block 810. In one embodiment, the processing logic filters the row as described in FIG. 7 above. At block 812, the processing logic performs a table scan of the right side table. In one embodiment, the processing logic performs a right-side table scan as described in FIG. 7 above.

The processing logic filters rows from the right table scan using the bloom filter and/or a range bloom filter at block 814. In one embodiment, the processing logic filters the rows using the bloom filter and/or a range bloom filter as described in FIG. 7 above. At block 816, the processing logic performs a left join and adds the left join hits to the results set at block 818 (e.g., as described in FIG. 7 above). The processing logic performs a right-side join at block 820 and adds the right-side join hits to the results set at block 822. The processing loop ends at block 824. Processing logic deduplicates the results set at block 826 and returns the deduplicated results set at block 828.

Figure 9:
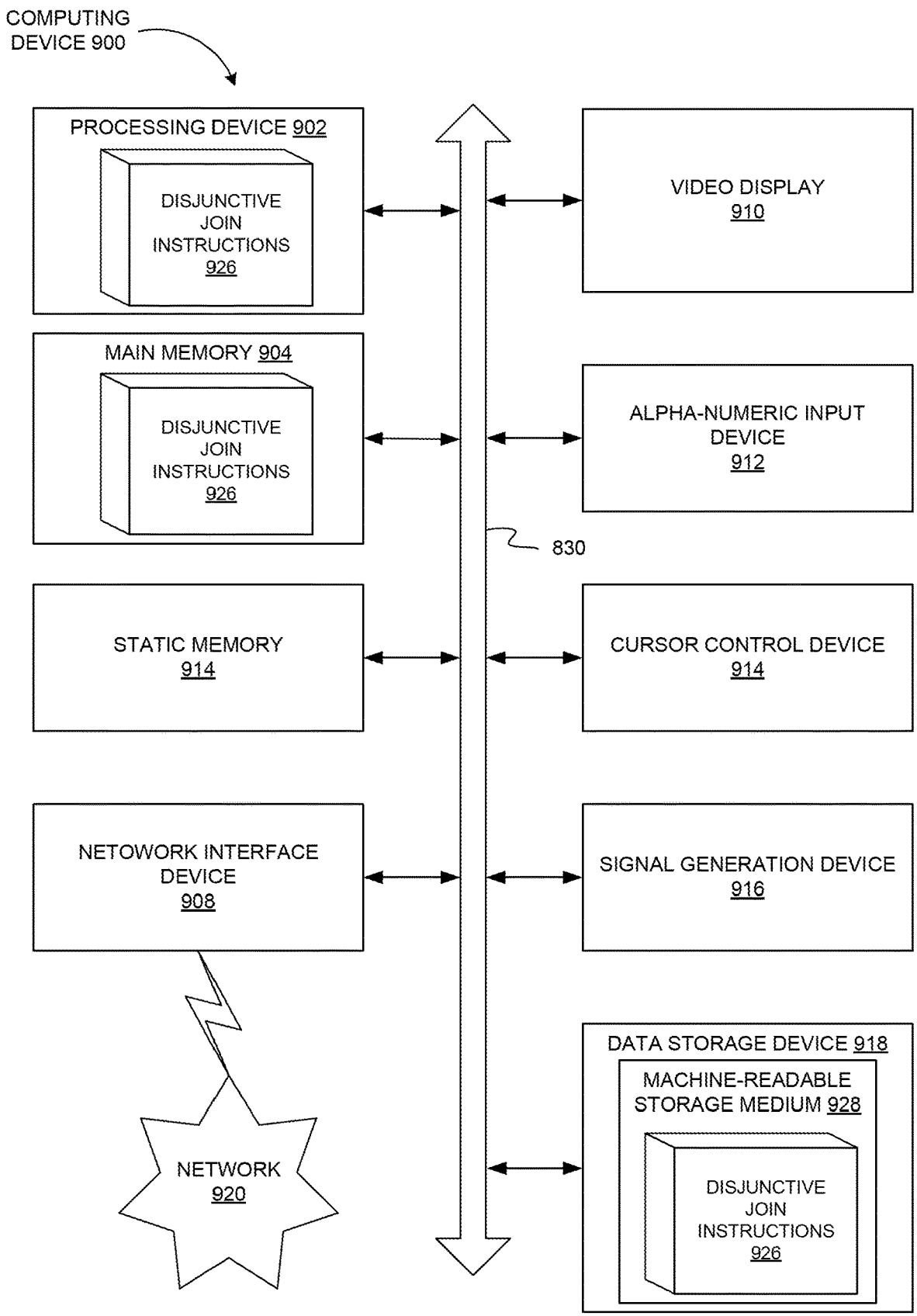
FIG. 9 is a block diagram of an example computing device that may perform one or more of the operations described herein, in accordance with some embodiments.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 99), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein. In one embodiment, processing device 902 represents cloud computing platform 110 of FIG. 1. In another embodiment, processing device 902 represents a processing device of a client device (e.g., client devices 101-104).

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 909 may include a computer-readable storage medium 928 on which may be stored one or more sets of instructions, e.g., instructions for carrying out the operations described herein, in accordance with one or more aspects of the present disclosure. Disjunctive join instructions 926 may also reside, completely or at least partially, within main memory 904 and/or within processing device 902 during execution thereof by computing device 900, main memory 904 and processing device 902 also constituting computer-readable media. The instructions may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "generating," "applying," "determining," "joining," "scanning," "adding," "adjusting," "deduplicating," "looking," "returning," "filtering," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
receiving a query with a conjunctive predicate and a plurality of disjunctive predicates for a plurality of tables;
generating, with a processor, a query plan for the query, wherein there is a join operator expression for each of the plurality of disjunctive predicates and each join operator expression includes at least a conjunctive predicate and a disjunctive operator;
generating a bloom filter for each of the plurality of disjunctive operators;
evaluating each of the plurality of join operator expressions using a corresponding one of the plurality of disjunctive operators and bloom filter for the each of the plurality of disjunctive predicates to generate a results set;
deduplicating the results set; and
returning the deduplicated results set.

2. The method of claim 1, wherein deduplicating the results set comprises:
deduplicating the results set using at least one or more row identifiers of the plurality of tables.

3. The method of claim 1, further comprising:
filter a left side table for each of the plurality of disjunctive predicates.

4. The method of claim 3, further comprising:
performing a left side join using the join operator, the filtered left side table, and a filtered right side table.

5. The method of claim 4, further comprising:
adding results from the left side join to the results set.

6. The method of claim 1, further comprising:
filtering a right side table of the plurality of join operator expressions using at least one of a bloom filter and a range bloom filter.

7. The method of claim 6, wherein the bloom filter is applied on a row-by-row basis to the right side table.

8. The method of claim 6, wherein the range bloom filter is applied to one or more micro-partitions of the right side table.

9. The method of claim 8, wherein each of the one or more micro-partitions comprises a file.

10. The method of claim 6, further comprising:
performing a right side join using the join operator, the filtered left side table, and a filtered right side table.

11. The method of claim 7, further comprising:
adding results from the right side join to the results set.

12. The method of claim 1, wherein each of the join operator expression includes a pair of conjunctive predicates and a disjunctive operator.

13. A system comprising:
a set of storage resources that store a plurality of tables;
a query processor, coupled to the set of storage resources, to,
receive a query with a conjunctive predicate and a plurality of disjunctive predicates for the plurality of tables,
generate a query plan for the query, wherein there is a join operator expression for each of the plurality of disjunctive predicates and each join operator expression includes at least a conjunctive predicate and a disjunctive operator,
generate a bloom filter for each of the plurality of disjunctive operators;
evaluate each of the plurality of join operator expressions using a corresponding one of the plurality of disjunctive operators and bloom filter for the each of the plurality of disjunctive predicates to generate a results set,
deduplicate the results set, and
return the deduplicated results set.

14. The system of claim 13, wherein the query processor deduplicates the results set by deduplicating the results set using at least one or more row identifiers of the plurality of tables.

15. The system of claim 13, wherein the query processor further to filter a left side table for each of the plurality of disjunctive predicates.

16. The system of claim 13, wherein the query processor further to perform a left side join using the join operator, the filtered left side table, and a filtered right side table.

17. The system of claim 16, wherein the query processor further to add results from the left side join to the results set.

18. The system of claim 13, wherein the query processor further to filter a right side table of the plurality of join operator expressions using at least one of a bloom filter and a range bloom filter.

19. The system of claim 18, wherein the bloom filter is applied on a row-by-row basis to the right side table.

20. The system of claim 18, wherein the range bloom filter is applied to one or more micro-partitions of the right side table.

21. The system of claim 20, wherein each of the one or more micro-partitions comprises a file.

22. The system of claim 18, wherein the query processor further to perform right side join using the join operator, the filtered left side table, and a filtered right side table.

23. The system of claim 18, wherein the query processor further to add results from the right side join to the results set.

24. The system of claim 13, wherein each of the join operator expression includes a pair of conjunctive predicates and a disjunctive operator.

25. A non-transitory machine-readable medium storing instructions which, when executed by one or more processors of a computing device, cause the one or more processors to:
receive a query with a conjunctive predicate and a plurality of disjunctive predicates for the plurality of tables;
generate a query plan for the query, wherein there is a join operator expression for each of the plurality of disjunctive predicates and each join operator expression includes at least a conjunctive predicate and a disjunctive operator;
generate a bloom filter for each of the plurality of disjunctive operators;
evaluating each of the plurality of join operator expressions using a corresponding one of the plurality of disjunctive operators and bloom filter for the each of the plurality of disjunctive predicates to generate a results set;
deduplicate the results set; and
return the deduplicated results set.

26. The non-transitory machine-readable medium of claim 25, wherein the one or more processors deduplicates the results set by deduplicating the results set using at least one or more row identifiers of the plurality of tables.

\* \* \* \* \*